(12) United States Patent
Marnell

(10) Patent No.: US 7,066,362 B2
(45) Date of Patent: Jun. 27, 2006

(54) CARRYING DEVICE

(76) Inventor: Michael J. Marnell, 147 Pine St., Kingston, NY (US) 12401

( * ) Notice: Subject to any disclaimer, the term of this patent is extended or adjusted under 35 U.S.C. 154(b) by 495 days.

(21) Appl. No.: 10/442,214

(22) Filed: May 20, 2003

(65) Prior Publication Data
US 2004/0232181 A1 Nov. 25, 2004

(51) Int. Cl.
*B60R 7/00* (2006.01)

(52) U.S. Cl. ............... 224/275; 248/148; 248/152; 296/37.15

(58) Field of Classification Search ........... 224/275; 248/148, 152, 174; 296/37.15
See application file for complete search history.

(56) References Cited

U.S. PATENT DOCUMENTS

| | | | | | |
|---|---|---|---|---|---|
| 3,326,446 A | * | 6/1967 | Goings | ............... | 229/904 |
| 3,499,595 A | * | 3/1970 | Brooks | ............... | 248/174 |
| 4,765,583 A | * | 8/1988 | Tenner | ............... | 224/275 |
| 4,967,992 A | * | 11/1990 | Menaged | ............... | 248/454 |
| 5,102,080 A | * | 4/1992 | Altieri, Jr. | ............... | 248/174 |
| 5,470,002 A | * | 11/1995 | DiStefano et al. | ............... | 224/275 |
| 5,868,367 A | * | 2/1999 | Smith | ............... | 248/174 |
| 5,887,406 A | * | 3/1999 | Bond | ............... | 248/148 |
| 5,899,529 A | * | 5/1999 | Chaucer | ............... | 224/275 |
| 6,135,546 A | * | 10/2000 | Demtchouk | ............... | 224/275 |
| 6,305,652 B1 | * | 10/2001 | Borke et al. | ............... | 248/174 |
| 6,422,440 B1 | * | 7/2002 | Stone | ............... | 224/275 |
| 2002/0092246 A1 | * | 7/2002 | Graham | ............... | 248/148 |

* cited by examiner

*Primary Examiner*—Gary E. Elkins

(57) ABSTRACT

A carrying device most specifically for carrying a pizza box in a level position when placed on a car seat which slopes downwardly from the front edge of the car seat toward the back rest. A pair of side panels extend from a back panel and are joined together at the ends of the side panels opposite from the back panel. End flaps are located on the ends of the side panels opposite form the back panel and are elevated above the side panels. Likewise, the back panel extends above the height of the side panels. The side panels have a bottom edge which moves closer to the top edge as the side panels extend from the back panel to the end flaps. A pizza box fits between the back panel and the end flaps. If the carrying device is to be used with boxes of varying sizes, perforations are located in the top edge of the side panels to permit a variety of portions of the top edges of the side panels to be turned down to hold pizza boxes of varying sizes.

17 Claims, 4 Drawing Sheets

CARRYING DEVICE

BACKGROUND OF THE INVENTION

1. Field of the Invention

This invention relates to carrying devices and more particularly to a device for carrying pizza boxes.

2. Prior Art and Objects

The consumption of pizza is substantial and the purchase of pizza for pick up to be taken home for eating at home is most common place. As is also common, the box in which the pizza is delivered is placed on the seat of an automobile for the trip back home. Car seats are not, however, level and slope from the front backwardly toward the back rest. As a result, the pizza box is not level and the pizza likewise is not level. The topping on a pizza, which universally includes cheese, has a substantial degree of fluidity and is readily capable of sliding off the pizza. This results in the pizza arriving at its destination with the topping piled up in a heap at one edge of the pizza or even off the pizza entirely.

It, therefore, is apparent that a carrying device which could hold the pizza box substantially in a level position would be desirable. Although such a carrying device should be re-useable, it still must be economical to produce. It should also be capable of providing advertizing space to assist in paying for the device. The carrying device should also include a means to hold auxiliary equipment such as knives and forks as well as napkins.

It should also be noted that the carrying device contemplated by this invention can be used in any situation where something needs to be maintained in a level position when placed on a sloping surface.

Accordingly, it is an object of this invention to provide a holder for a box which permits the box to remain level when placed on a sloping surface.

It is another object of this invention to provide a holder for a box which can be economically produced and sufficiently durable to be reused.

It is still another object of this invention to provide a device for carrying a box which is capable of having advertizing placed on it.

It is still a further object of this invention to provide a carrier for a box which provides additional space for holding incidental implements.

SUMMARY OF THE INVENTION

A carrying device is provided for retaining boxes such as pizza boxes in a reasonably level position when placed on a sloping surface such as a car seat. A back panel is included with two side panels extending from the back panel. Each side panel has a top edge and a bottom edge and also has an end remote from the back panel. The back panel extends above the side panels. Each side panel includes an end flap located at the ends of the side panels and each end flap extends above the top edges of both side panels.

DETAILED DESCRIPTION OF THE DRAWINGS

DETAILED DESCRIPTION OF THE NUMERALS

| DESCRIPTION | NUMERAL |
|---|---|
| Side Panels | 11 |
| End Flaps | 13 |
| Front End | 15 |
| Point | 16 |
| Short Panel | 17 |
| Front Stop | 18 |
| Back Panel | 19 |
| Inside Surface | 21 |
| Outside Surface | 23 |
| Top Edge | 25 |
| Bottom Edge | 27 |
| Back stop | 28 |
| Auxiliary Box | 29 |
| Top Section | 31 |
| Bottom Section | 33 |
| Tabs | 35 |
| Side Section | 37 |
| Back Section | 39 |
| Edges | 41 |
| Vertical Slots | 43 |
| Top Tab | 45 |
| Horizontal Slot | 47 |
| Perforations | 49 |
| First Perforation | 53 |
| Second Perforation | 55 |
| Third Perforation | 57 |
| Forth Perforation | 59 |
| Fifth Perforation | 61 |

DETAILED DESCRIPTION OF THE PREFERRED EMBODIMENT

Figure 1:
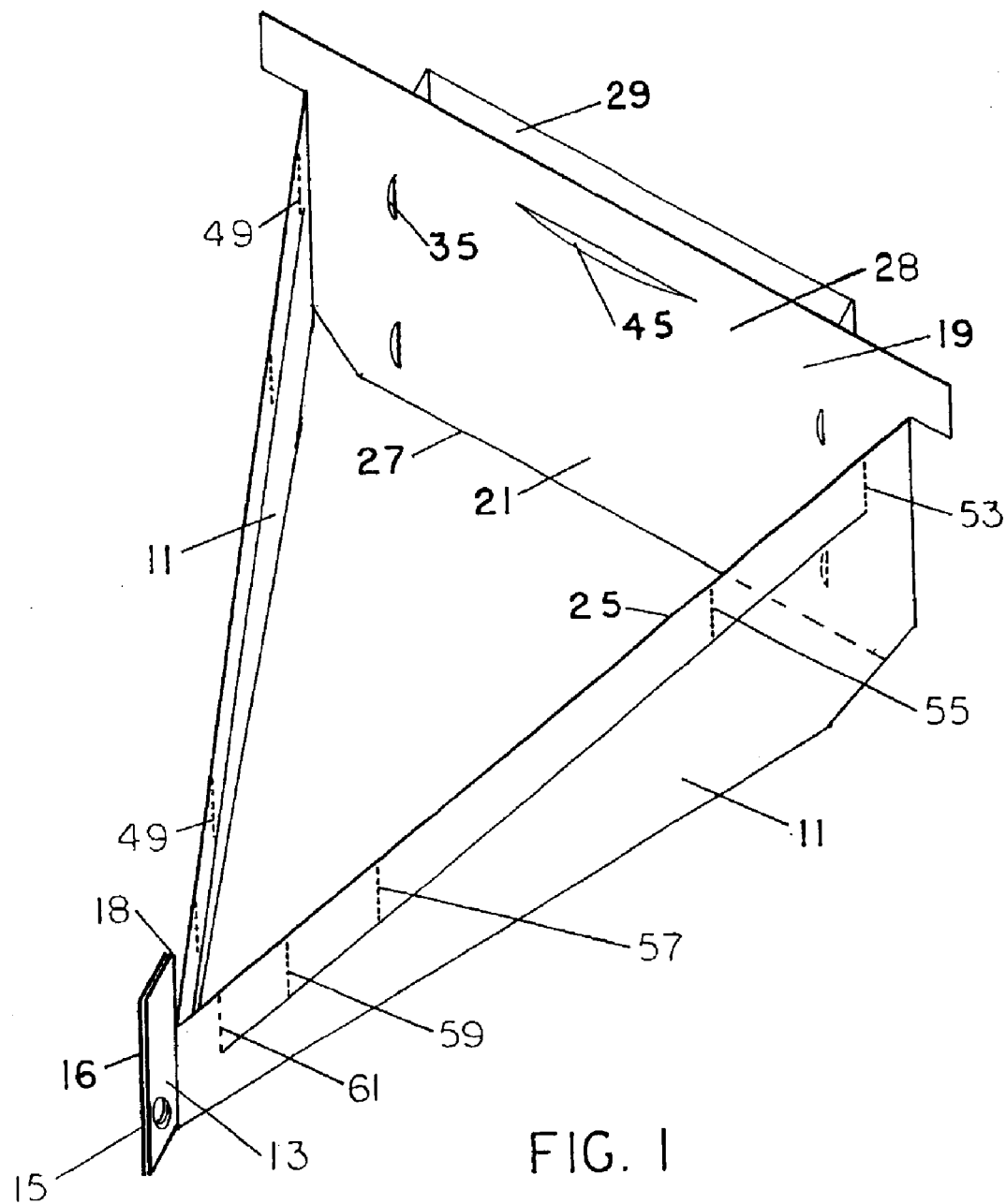
FIG. 1 is a pictorial view of the carrying device showing the inside of the back panel with a pointed end.
Figure 1A:
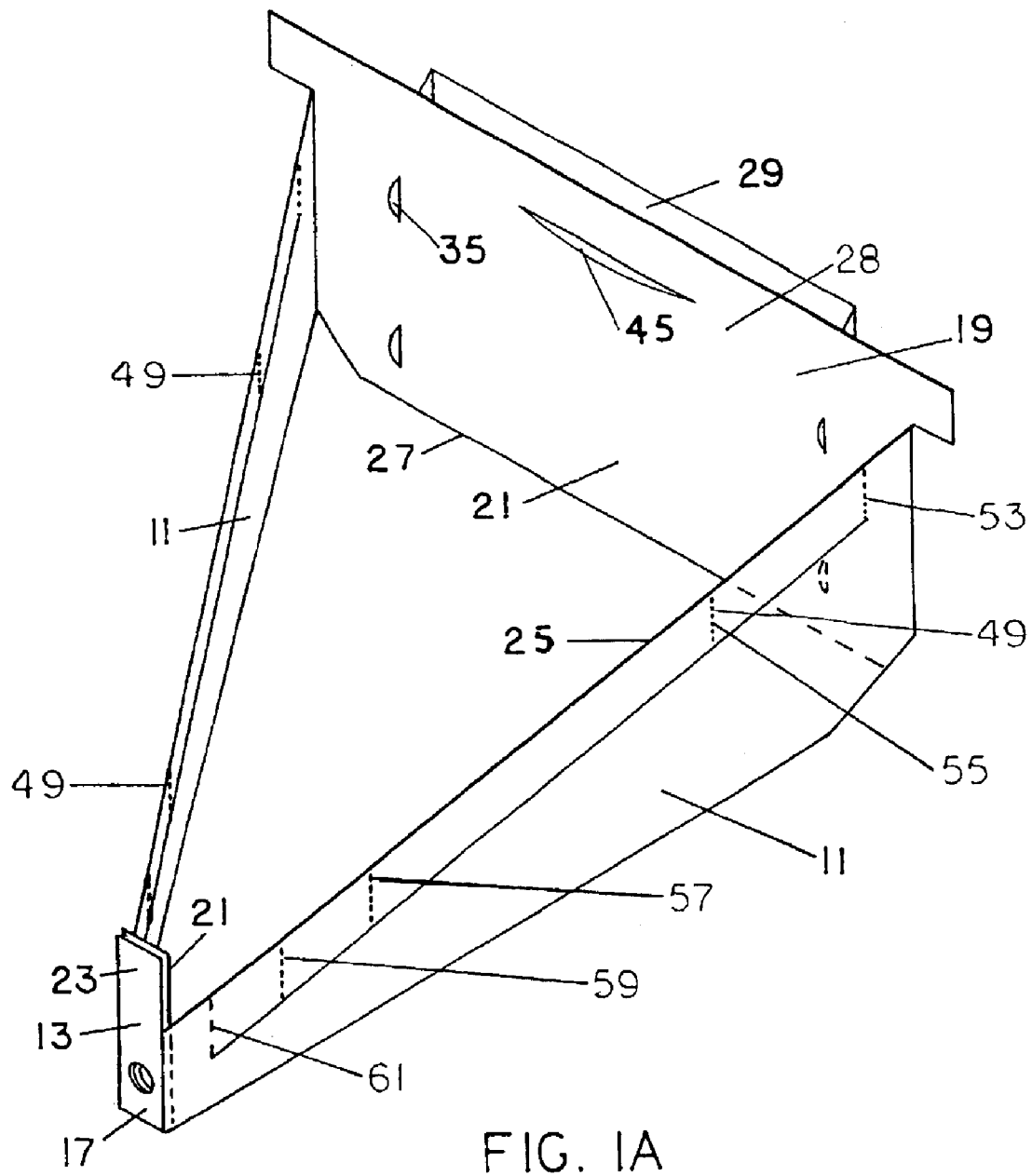
FIG. 1A is a partial pictorial view showing the front end of the carrying device with a short panel in place of the pointed end.
Figure 3:
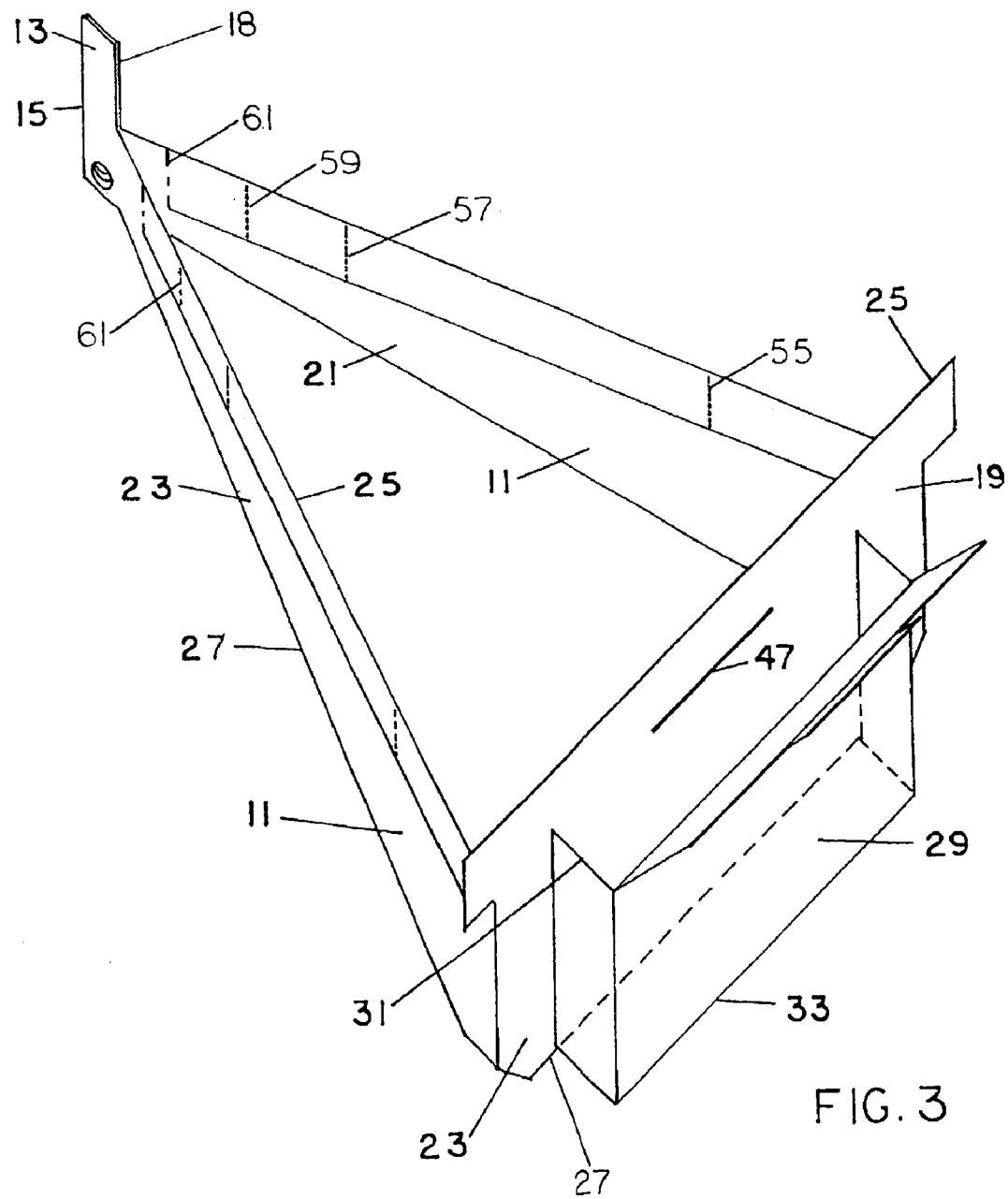
FIG. 3 is a pictorial view of the carrying device showing the outside surface of the back panel with an auxiliary box affixed to it for retaining miscellaneous items.

Referring now to FIG. 1, the carrying device in accordance with this invention can been seen. The carrying device has two side panels 11 both of which have end flaps 13 at their front end 15 which join together either to form a point 16 as shown in FIGS. 1 and 3 or which overlap one another to form a short panel 17 as seen in FIG. 1A. Regardless of the manner in which the end flaps 13 are joined, they provide a front stop 18. The carrying device further has a back panel 19. With the two side panels 11 joined together either to form a point 16 or a short panel 17, the carrying device has a triangularly-shaped configuration.

The side panels 11 and the back panel 19 each have an inside surface 21 located inside the triangle and an outside surface 23 on the outside of the carrying device. The back panel 19 and the side panels 11 each have a top edge 25 and a bottom edge 27. The back panel 19 has a greater distance from the bottom edge 27 to the top edge 25 than the two side panels 11 which both have the same graduated distances between the top edge 25 and the bottom edge 27. The distance between the top edge 25 and the bottom edge 27 on both side panels 11 is the largest adjacent the back panel 19 and is the least adjacent to the front end 15. Since the back panel 19 extends above the side panels 11, the back panel serves as a back stop 28.

The carrying device also serves to provide a facility to carry any one of numerous items that may be desired when purchasing a pizza. By way of example, paper napkins and utensils are normally included with the purchase of a pizza. On the outside surface 23 of the back panel 19, an auxiliary box 29 is mounted. The auxiliary box 29 may have various configurations but an auxiliary box 29 that covers most of the back panel 19 but extends only a short distance beyond the outside surface 23 of the back panel 19 is most desirable. In this way, the auxiliary box 29 does not substantially extend the size of the carrying device from the front end 15 and beyond the back panel 19 while still providing an auxiliary box 29 of reasonable size for holding a wide variety of useful items. The top section 31 of the auxiliary box 29 is adjacent the top edge 25 of the back panel 19 and the bottom section 33 of the auxiliary box 29 is adjacent the bottom edge 27 of the back panel 19.

Figure 2:
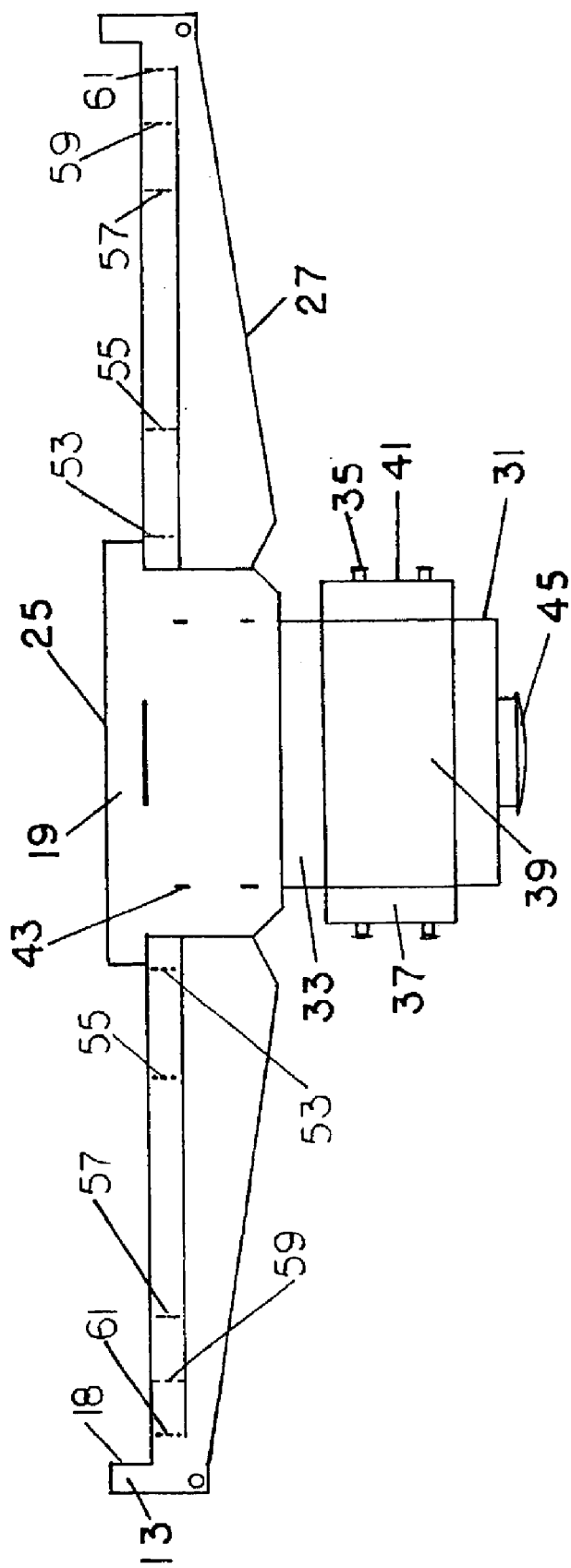
FIG. 2 is a plan view of the carrying case with the sides in the same plane as the back panel.

The auxiliary box 29 is affixed to the outside surface 23 of the back panel 19 by means of side tabs 35 which are best seen in FIG. 2. The auxiliary box 29, in addition to the top section 31 and the bottom section 33 has two side sections 37 and a back section 39 as well as the top section 31. The side tabs 35 are located on the edges 41 of the side panels 11. The back section 39 is generally parallel to the back panel 19. The side tabs 35 are located on the edges 41 of the side sections 37 remote from the back section 39. The back panel 19 has a plurality of vertical slots 43 which receive the side tabs 35 to secure the auxiliary box 29 to the back panel 19. The top section 31 has a top tab 45 which is secured into a horizontal slot 47 in the back panel 19.

As has been previously stated, the front end 15 of the carrying device may have either a pointed end 16 or a short panel 17. The pointed end 16 is created by the inner surfaces 21 of both end flaps 13 being placed together. The short panel 17 is formed by the inside surface 21 of one end flap 13 being placed over the outside surface 23 of the other end flap 13. Regardless of whether or not the pointed end 16 or the short panel 17 is used, the end flaps 13 on the two side panels 11 can be joined by any suitable means but stapling appears to be a most suitable means of joining the end flaps 13. The top edges 25 of the side panels 11 are located substantially at right angles to the back panel 19. The bottom edges 27 of the side panels 11 are located at an acute angle to the back panel 19 and the height of the side panels 11 diminishes from the back panel 19 to the end flaps 13. The end flaps 13 have a greater distance between the bottom edge 27 and the top edge 25 which extends well beyond the top edges 25 of both side panels 11 to form the stop 18 at the front end 15 of the carrying device regardless of whether the two end flaps 13 are joined to form a pointed end 16 or a short panel 17.

As is well known, pizza boxes come in varying sizes generally ranging from pizza boxes that are twelve inches square through fourteen and sixteen inch square pizza boxes up to eighteen inch pizza boxes. It is essential that any carrying device have the capacity to hold any such pizza box and to function readily with any size pizza box. However, the carrying device may be constructed to accommodate a pizza box of only one size.

In order to accommodate boxes of varying sizes, the top edge 25 of each side panel 11 has perforations 49 that permit cuts to be readily formed in the top edges 25 generally at right angles to the top edge 25. In a carrying device that can accommodate twelve, fourteen, sixteen and eighteen inch boxes, a total of five perforations 49 are required in each of the two side panels 11. All the perforations, 49 are generally at right angles to the top edge 25 and extend approximately one and one-quarter inches into the side panels from the top edge. Approximately one and one quarter inches toward the end 15 from the back panel 19, there is a first perforation 53. Approximately five and three-eights inches from the back panel 19 toward the front end 15, there is second perforation 55. Approximately fourteen and one quarter inches toward inches from the back panel 19 toward the front end 15, there is a third perforation 57. Approximately sixteen and three quarters inches from the back panel 19 toward the front end 15 there is a fourth perforation 59. Beyond the fourth perforation 59 a fifth perforation 61 is located a distance of eighteen and five eights inches from the back panel 19 toward the front end 15.

It should be noted that since the two side panels 11 merge into one another at the front end 15. The distances along the side panels 11 is greater between two perforations 49 than when measured in a straight line at right angles to the back panel 19. Thus, the distances between perforations 49 along the side panels 11 is greater than the size of the box actually accommodated between the same two perforations.

In use, an eighteen inch pizza box is placed between the end flaps 13 and the back panel 19 while it rests on the top edges 25 of the side panels 11. With a sixteen inch box, the first perforations 53 and the fifth perforations 61 are opened and the top edges 25 of both side panels 11 are turned down between the first perforations 53 and the fifth perforations 61. The sixteen inch pizza box is placed upon the turned down portion of the side panels 11 between the first perforations 53 and the fifth perforation 61. With a fourteen inch pizza box, the first perforations 53 and the fourth perforations 61 are both opened and the fourteen inch pizza box is placed in the opening when the top edges 25 of both side panels 11 between the first perforations 53 and the fourth perforations 59 are turned down. When a twelve inch pizza box is used, two alternate sets of perforations may be used. The second perforations 55 and the fifth perforations 59 of both side panels 11 are opened and the twelve inch box is placed between the second perforations 55 and the fifth perforations 61 after the top edges 25 are turned down. In the same manner, a twelve inch box may be placed between the first perforations 53 and the third perforations 57.

Accordingly, it can be seen that pizza boxes of varying sizes can be held securely in the carrying device, and when the carrying device is placed on a sloping car seat with the back panel against the seat back, the pizza box will be substantially level.

To assist in the cost of the carrying device, the outside surface 23 of the side panels 11 and the outside surface 23 of the back section 39 of the auxiliary box 29 provide space for printed matter to be placed of an advertising nature. In addition, the auxiliary box 29 provides a space for a flier to be placed that contains advertising and other promotional material.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

The claims are:

1. A carrying device for retaining boxes such as pizza boxes in a reasonably level position when placed on a sloping surface such as a car seat, such carrying device comprising:

a back panel; and two side panels extending from the back panel, each side panel having a top edge and a bottom edge and an end remote from the back panel, the back panel extending above the side panels, each side panel including an end flap located at the ends remote from the back panel, each end flap extending above the top edges of both side panels.

2. A carrying device according to claim 1 wherein each side panel has at least one perforation extending substantially at right angles from the top edges of the side panels.

3. A carrying case according to claim 1 wherein the back panel has an inside surface and a top edge and a bottom edge and two side edges, each side panel being connected to one of the side edges of the back panel.

4. A carrying case according to claim 1 wherein the back panel has an inside surface and an outside surface and further includes an auxiliary box mounted on the outside surface of the back panel.

5. A carrying device according to claim 1 wherein the back panel has a top edge and a bottom edge, the bottom edges of the side panels being connected to the side edges of the back panel at the bottom of the back panel.

6. A carrying device according to claim 1 wherein each end flap has an inside surface and an outside surface and wherein the inside surface of both end flaps are in contact with one another.

7. A carrying device according to claim 1 wherein each end flap has an inside surface and an outside surface and wherein the inside surface of one end flap is in contact with the outside surface of the other flap.

8. A carrying device according to claim 1 wherein the top edges of the side panels extend substantially at right angles to the side edges of back panel and the lower edges of the side panels are located at an acute angle to the side edges of the back panel.

9. A carrying case according to claim 1 wherein the top edge of each side panel has a plurality of perforations extending partially into each side panel for a part of the distance from the top edge to the bottom edge, each perforation being located generally at right angles to the top edge of the side panel.

10. A carrying device according to claim 1 wherein the top edge of each side panel has five perforations extending partially into each side panel for a part of the distance from the top edge to the bottom edge, each perforation being located generally at right angles to the top edge of the side panel and being in a spaced relationship to one another along the side panels.

11. A carrying device for retaining boxes such as pizza boxes in a reasonably level position when placed on a sloping surface such as a car seat, such carrying device comprising:

a back panel having an inside surface and an outside surface and a top edge and a bottom edge and two side edges;

two side panels extending from the back panel, each side panel having a top edge and a bottom edge and an end remote from the back panel, the back panel extending above the side panels, each side panel including an end flap located at the ends remote from the back panel, each end flap extending above the top of both side panels, each end flap having an inside surface and an outside surface and being in contact with one another, the top edges of the side panels extending substantially at a right angle to the side edges of the back panel and the lower edges of the side panels extending substantially at an acute angle to the side edges of the back panel.

12. A carrying device according to claim 11 further including an auxiliary box mounted on the outside surface of the back panel.

13. A carrying device according to claim 11 wherein the inside surface of both end flaps are in contact with one another.

14. A carrying device according to claim 11 wherein the inside surface of one end flap is in contact with the outside surface of the other end flap.

15. A carrying device according to claim 11 wherein the top edge of each side panel has a plurality of perforations extending partially into each side panel for a part of the distance from the top edge to the bottom edge, each perforation being located generally at right angles to the top edge of the side panel and being in a spaced relationship to one another along the side panels.

16. A carrying case according to claim 11 wherein the top edge of each side panel has five perforations extending partially into each side panel for a part of the distance from the top edge to the bottom edge, each perforation being located generally at right angles to the top edge of the side panel and being in a spaced relationship to one another along the side panels.

17. A carrying case according to claim 11 wherein the back panel includes an auxiliary box mounted on the outside surface of the back panel.

* * * * *